W. S. ELLIOTT.
TURBINE.
APPLICATION FILED NOV. 5, 1907.

905,858.

Patented Dec. 8, 1908.

WITNESSES
W. W. Swartz
R. A. Balderson

INVENTOR
W. S. Elliott

UNITED STATES PATENT OFFICE.

WILLIAM S. ELLIOTT, OF PITTSBURG, PENNSYLVANIA.

TURBINE.

No. 905,858.      Specification of Letters Patent.      Patented Dec. 8, 1908.

Application filed November 5, 1907. Serial No. 400,736.

*To all whom it may concern:*

Be it known that I, WILLIAM S. ELLIOTT, of Pittsburg, in the county of Allegheny and State of Pennsylvania, have invented a new and useful Improvement in Turbines, of which the following is a full, clear, and exact description, reference being had to the accompanying drawings, forming part of this specification, in which—

Figure 1:
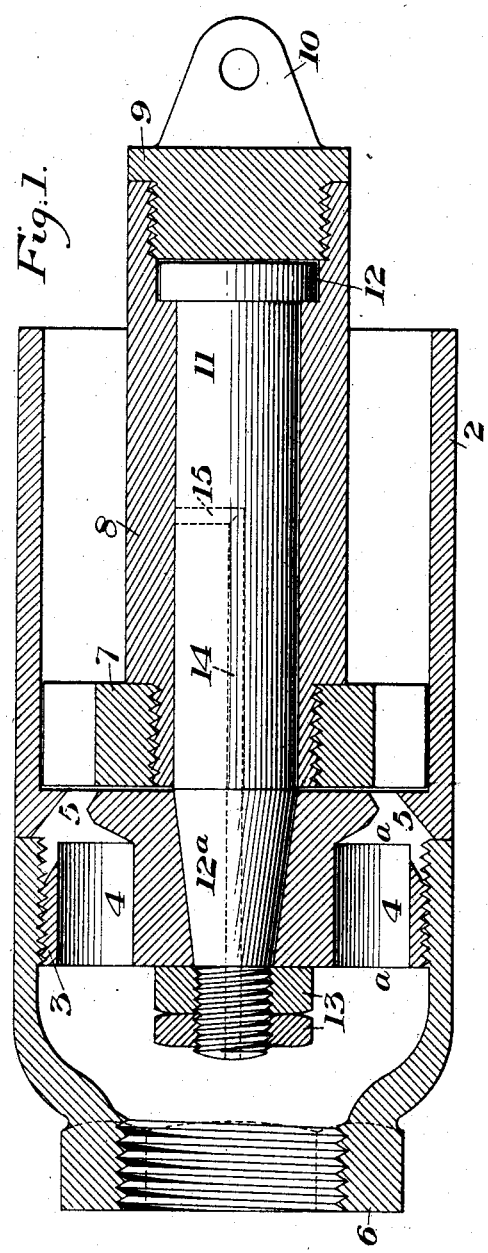
Figure 2:
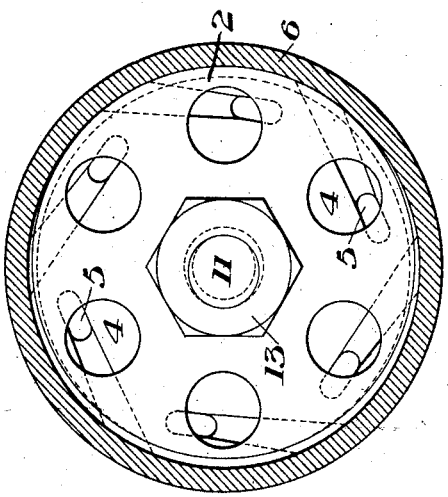

Figure 1 is a longitudinal section of my improved turbine; and Fig. 2 is a cross section of the same in the rear of the stationary turbine member.

My invention relates to the class of turbines, and particularly those for driving tube cleaning heads in the cleaning of boiler tubes or other tubes.

The object of the invention is to provide a very simple, cheap and compact form of turbine for this purpose.

In the drawings, 2 represents the turbine case, which is preferably of cylindrical form and is provided with an integral rear head having a reduced externally-screw-threaded portion 3. This casing is preferably formed as a casting or cut out of solid metal, and is provided with the longitudinal ports 4, extending partially through its rear portion. These ports, extending from *a* to *a*, may be formed in the casting itself or drilled. This rear portion of the casting is the stationary part of the turbine, and to provide the inclined ports leading to the rotary member of the turbine, I bore in these ports 5, through the externally-threaded portion. The angle of these ports is indicated by the dotted and full lines in Fig. 2, and they cut through the longitudinal ports 4, so that the water entering the hose nozzle 6 will flow through the ports 4, and thence through the ports 5 to the revoluble member 7 of the turbine. This revoluble member 7 may be of the ordinary turbine type, with inclined ports, and is screwed or otherwise secured to a hollow bushing or bearing sleeve 8, having screwed in its front end the plug 9, provided with the device 10 for the head or universal joint.

11 is the shaft of the turbine, this having an enlarged portion 12, which is seated in the enlarged bore of the bushing 8, and is slipped in before the plug 9 is screwed to place. The rear end portion 12ª of this shaft is preferably tapered down in cone shape, and extends through a corresponding central hole in the stationary member, being secured by suitable nuts 13, screwed on its rear end portion, which projects into the hose coupling member. This hose coupling member is screwed upon the externally screw-threaded portion 3 at the rear of the casing casting, and is preferably of the same external diameter as the shell of this casing. The shaft 11 is stationary and the sleeve or bushing with its front plug and revoluble turbine member revolve around it.

In order to lubricate the long bearing between the bushing and the shaft, I preferably bore a hole centrally through the shaft, as shown in dotted lines at 14, and then bore a side hole 15 into this longitudinal hole 14. In this way, water or other lubricant may be fed into the hole and will pass to the bearing surfaces and keep them lubricated.

The advantages of my invention will be apparent to those skilled in the art. The device has very few parts, is simple and cheaply made, and may be easily repaired.

The stationary turbine portion may be formed separately and secured to the casing and various other changes may be made in the form and arrangement of the casing, the stationary and revoluble members, the shaft connections, etc., without departing from my invention.

I claim:

1. In a turbine, the combination with a casing, of a rotary turbine member, and a stationary turbine member having laterally inclined ports bored or cut through its front wall from the outside and terminating at their inner ends in such position as to deliver water to the ends of the passages in the rotary member, substantially as described.

2. In a turbine, the combination with a casing, of a rotary turbine member, and a solid stationary turbine member containing supply ports inclined rearwardly and outwardly from its front end and opening into the rear ends of the rotary turbine ports, substantially as described.

3. In a turbine, the combination with a casing having a stationary turbine member at its rear with holes bored from the outside inwardly therethrough in an inclined position relative to the turbine axis, and a turbine member revolubly mounted on a shaft extending through and secured to the stationary member, substantially as described.

4. In a turbine, the combination with a casing having an integral solid reduced head portion with longitudinal ports therein extending partly through the head, and inclined ports cut from the outside inwardly and forwardly and communicating with the longitudinal ports, substantially as described.

5. In a turbine, the combination with a rotary turbine member, of a stationary turbine member having longitudinal ports extending partly therethrough and inclined ports cutting through the longitudinal ports and extending forwardly at angles to the turbine axis, said ports opening to the rear ends of the rotary member ports, substantially as described.

6. In a turbine, the combination with a stationary turbine member having longitudinal ports coöperating with inclined ports machined at an angle from the outside inwardly, of a closure for covering the outer ends of the inclined ports, substantially as described.

7. In a turbine, the combination with a casing having a stationary turbine member at its rear end and provided with ports opening through its front and extending outwardly and rearwardly to the outside of the member, and a closure or cap screwed over the outer ends of said holes, said stationary member having openings leading into the inclined ports, substantially as described.

8. In a turbine, the combination with a casing having an integral rear head forming a stationary turbine member with longitudinal ports coöperating with inclined ports opening to the outside, of a cap covering the outer ends of said inclined ports, and a revoluble turbine member mounted upon a sleeve surrounding a shaft secured to the stationary turbine member, substantially as described.

9. In a turbine, the combination with a casing having an integral rear head forming a stationary turbine member with longitudinal ports coöperating with inclined ports opening to the outside, of a cap covering the outer ends of the inclined ports, and a revoluble turbine member mounted upon a sleeve surrounding a shaft secured to the stationary turbine member, the sleeve having a closing cap at its front end carrying the attachment for the tool, substantially as described.

10. In a turbine, the combination with a casing, of a stationary turbine member having machined ports extending from its front end rearwardly and outwardly to its circumference, and rear openings leading into said ports, and a closure for the outer ends of the inclined ports, substantially as described.

In testimony whereof, I have hereunto set my hand.

WILLIAM S. ELLIOTT.

Witnesses:
JOHN MILLER,
H. M. CORWIN.